United States Patent [19]

Mansour

[11] 4,449,828
[45] May 22, 1984

[54] MIXING APPARATUS

[75] Inventor: Maher L. Mansour, Columbus, Ohio

[73] Assignee: Ashland Oil, Inc., Ashland, Ky.

[21] Appl. No.: 476,363

[22] Filed: Mar. 17, 1983

Related U.S. Application Data

[63] Continuation of Ser. No. 200,956, Oct. 27, 1980, abandoned.

[51] Int. Cl.³ .............................................. B01F 7/26
[52] U.S. Cl. .................................. 366/147; 366/263; 422/202; 422/119; 422/227; 422/230
[58] Field of Search .................. 366/7, 134, 136, 137, 366/147, 159, 172, 173, 262, 263–265, 154, 142, 144; 422/138, 199, 200, 202, 198, 119, 227, 230

[56] References Cited

U.S. PATENT DOCUMENTS

| | | | |
|---|---|---|---|
| 865,793 | 9/1907 | Morrison | 366/136 |
| 1,780,853 | 11/1930 | Walsh . | |
| 2,554,492 | 5/1951 | Hartman | 366/154 |
| 3,253,650 | 5/1966 | McEntee . | |
| 3,400,051 | 9/1968 | Hofschneider . | |
| 3,460,810 | 8/1969 | Mueller | 366/263 |
| 3,687,288 | 8/1972 | Lynch | 366/142 |
| 3,723,390 | 3/1973 | Carpenter . | |

FOREIGN PATENT DOCUMENTS 1196763  12/1959  France .................. 366/137

Primary Examiner—Robert W. Jenkins
Attorney, Agent, or Firm—Wood, Herron & Evans

[57]      ABSTRACT

Mixing apparatus comprising a vessel having a centrally disposed vertical draft tube and a centrifugal impeller at the lower end of the draft tube. A plurality of vertical heat exchanger tubes surround the draft tube. Ports are provided for the inlet of raw material and the outlet of product. The impeller draws liquid down through the draft tube, mixes it in an area of turbulence below the impeller and forces it up the heat exchanger tubes. Materials react in the heat exchanger tubes as in a plug flow reactor and elsewhere in the vessel the liquids mix and react as in a back mix reactor.

The equipment is usable for continuous as well as batch operations.

7 Claims, 6 Drawing Figures

MIXING APPARATUS

This is a continuation of application Ser. No. 200,956, filed Oct. 27, 1980, now abandoned.

This invention relates to a method and apparatus for mixing liquids; liquids and gases; and liquids and gases with powdered solids.

Throughout this specification, the term "mixing" will be used to refer to the bringing together in intimate relationship of two or more liquids. Mixing will be used as a generic term for blending, reacting and any other processes wherein fluids are brought together in intimate contact. "Blending" will be used to refer to the combining of two liquids or liquids and powdered solids where there is not necessarily a chemical reaction as, for example, in the dissolving of one liquid into another.

"Reacting" will be used to refer to a chemical process wherein liquids are intimately mixed and a chemical reaction takes place between the two liquids, or the liquids and powdered solids and gases.

Mixing vessels, and principally reactors, take a wide variety of forms. In general, they require a vessel in which the liquids are brought together and agitated for mixing. A heat exchange surface is provided for adding or removing heat. The mixing may be performed at atmospheric pressure or at any reduced or elevated pressures. The agitators may be radial wherein the agitator blades rotate about a vertical axis with the blades vertically oriented to impart radial flow to the liquids or the agitators may be axial wherein the blades are at an angle to vertical to impart an axial component to the liquids during agitation. The agitator may be simply a propeller of the marine propeller variety.

The heat exchange surface may be helical coils, spiral coils or other types of heat exchange surface. The heat exchange surface may be disposed within the vessel, or it may be located outside of the vessel with pipe and a pump conveying liquids within the vessel to the heat exchanger to receive or give up heat and thereafter be returned to the vessel.

The latter type of mixing apparatus or reactor has been referred to as a "back mix" reactor wherein raw material is introduced into the vessel and is mixed. A portion of the liquid in the vessel is diverted through the heat exchanger and is returned and back mixed with the liquid in the vessel as well as with the raw material being added to the liquid in the vessel. This mixing apparatus may be a continuous apparatus wherein raw material is continuously introduced into the vessel and mixed and the product of the mixing is continuously extracted from the vessel or, alternatively, it may be a batch or stirred tank reactor wherein all of the constituents are mixed in one batch until the mixing process, be it blending or reacting, is completed and thereafter the total batch of product is removed.

This invention is an improvement upon the type of apparatus wherein the heat exchanger is separate from the mixing vessel and employs a pump and plumbing to convey a portion of the liquid in the mixing vessel through the heat exchanger and return it to the vessel. That apparatus, involving mixing in one vessel and heat exchange in a separate external line, has disadvantages of cost, difficulty of maintenance, and some hazards residing primarily in the external heat exchange system. This system, and particularly the pump, requires mechanical or rotating seals. These seals develop leaks and to the extent that the system involves the use of noxious or toxic chemicals, there are dangers to the personnel using the equipment. The dangers are heightened when the mixing operation takes place at elevated pressures.

An objective of the present invention has been to provide improvement in apparatus for mixing liquids wherein heat must be added or removed from the liquid.

The objective is attained by providing a vessel having a central draft tube, a bundle of vertical heat exchanger tubes surrounding the draft tube and an impeller pump, preferably a centrifugal impeller, located at the bottom of the draft tube.

This structure admits of a novel concept in the processing of liquids. The liquids introduced into the vessel are back mixed in the area above the draft tube, in the draft tube itself, and in the turbulent area below the draft tube. These areas combine to provide back mixing of the liquids. The centrifugal impeller forces such back mixed liquids up the heat exchanger tubes. In the excursion up the heat exchanger tubes, the liquid is an identifiable liquid whose constitution is not changed by the addition of raw material and the like. The flow through the heat exchanger tubes provides a finite residence time during which the reaction or heat transfer tends to move toward completion without the introduction of additional raw material. As the liquid exits from the heat exchanger tubes, it is introduced into the back mix area and is there mixed with the entering raw material and previously mixed liquids.

The heat exchanger tubes may be considered to be a "plug flow" reactor, that is, a type of reactor wherein previously mixed constituents are moved straight through tubing wherein a reaction of previously mixed materials proceeds toward completion during the excursion through the tubing while heat is added or removed from the liquid.

The process performed in the combined apparatus of the invention may be considered to be a series of sequential operations: first, mixing and reacting the raw materials in the back mix area; second, reacting materials in the plug flow area of the apparatus; third, back mixing the reacted materials along with the raw materials; fourth, reacting the materials in the plug flow portion of the apparatus, and so on, to infinity.

Depending upon the blending process or reaction process, the parameters of the apparatus may be varied (e.g., the pump size and speed, the length and diameter of the tube) to vary the resistance time of the liquid in the back mix area of the apparatus and the plug flow area of the apparatus.

In addition to the advantages of the general concept described above, there are additional advantages and features of the invention. For example, the device as a reactor provides for a superior method and apparatus for making polyester wherein one of the constituents is propylene oxide which is a vapor at room temperature and which must be reacted under high pressure. Heretofore, that product has been manufactured in a Marco reactor which is a complex reactor made up of a series of back mix stages through which the reacting liquids pass with agitation in each stage. The reactor requires several gasket type seals in addition to one main mechanical seal. The raw materials are added into the successive stages and are agitated in those successive stages. The complexity of the apparatus and the problems with its maintenance have been so extensive that the manufacture of that reactor has been discontinued.

In the method of making polyester resins in the apparatus of the present invention, reactants are introduced at the upper end and lower end of the vessel and the product is removed from the side of the vessel immediately above the bundle of heat exchanger tubes. The centrifugal impeller, drawing liquid through the draft tube, creates a vortex above the draft tube onto which relatively small amounts of reactant are introduced. The reactant is drawn down the draft tube and is mixed with the previously mixed liquid as well as the newly introduced reactants in the lower end of the vessel. In the lower end of the vessel there is an area of great turbulence created by the centrifugal impeller. The thus back mixed reactants are forced through the heat exchanger tubes during which they may have a residence time of approximately ten seconds during which a plug flow reaction takes place. A small portion of product is removed at the top of the heat exchanger tubes. That product will consist of constituents having varying degrees of polymerization ranging from very small portions of barely polymerized product to highly polymerized product which can be depicted as a bell curve wherein the major portion of the product is the polyester resin with a desired degree of polymerization.

It can be seen from the example of the manufacture of the polyester resin that the method and apparatus of the present invention is a substantial improvement over previously known reactors in terms of simplicity, cost and maintenance primarily in the complete elimination of mechanical or rotating seals as well as the external plumbing that would be required to move the liquid through an external heat exchanger.

The invention has advantages if used as a batch reactor as, for example, in reacting materials which may gel or foul if reacted too long or wherein an operator has failed to add an inhibitor. Commonly, such polymers are manufactured in a batch reactor wherein heat exchange areas are located within the reactor. If there is a gelling of the product within the reactor, substantial time and labor is required to remove it by literally jack hammering the gelled product out of the reactor. Particularly difficult is the cleaning around the heat exchange tubing.

In accordance with the present invention, the mixing vessel as heretofore described may be mounted at the lower end of and in communication with a substantially larger batch mixing vessel with the product continuously drawn downwardly through the draft tube and forced upwardly through the heat exchanger in the smaller reactor. If gelling should occur, the two vessels may be separated. The lower vessel, of the present invention, can be cleaned by simply drilling straight through the draft tube and the heat exchanger tubes. The larger vessel may be much more easily cleaned, for there is no requirement for chiseling gelled product from around heat transfer coils. The cleaning process in the prior art batch mixers might require as much as two weeks, whereas in the present invention the cleaning operation can take place in about two days.

The several features and advantages of the present invention will become more readily apparent from the following detailed description taken in conjunction with the accompanying drawings in which.

Figure 1:
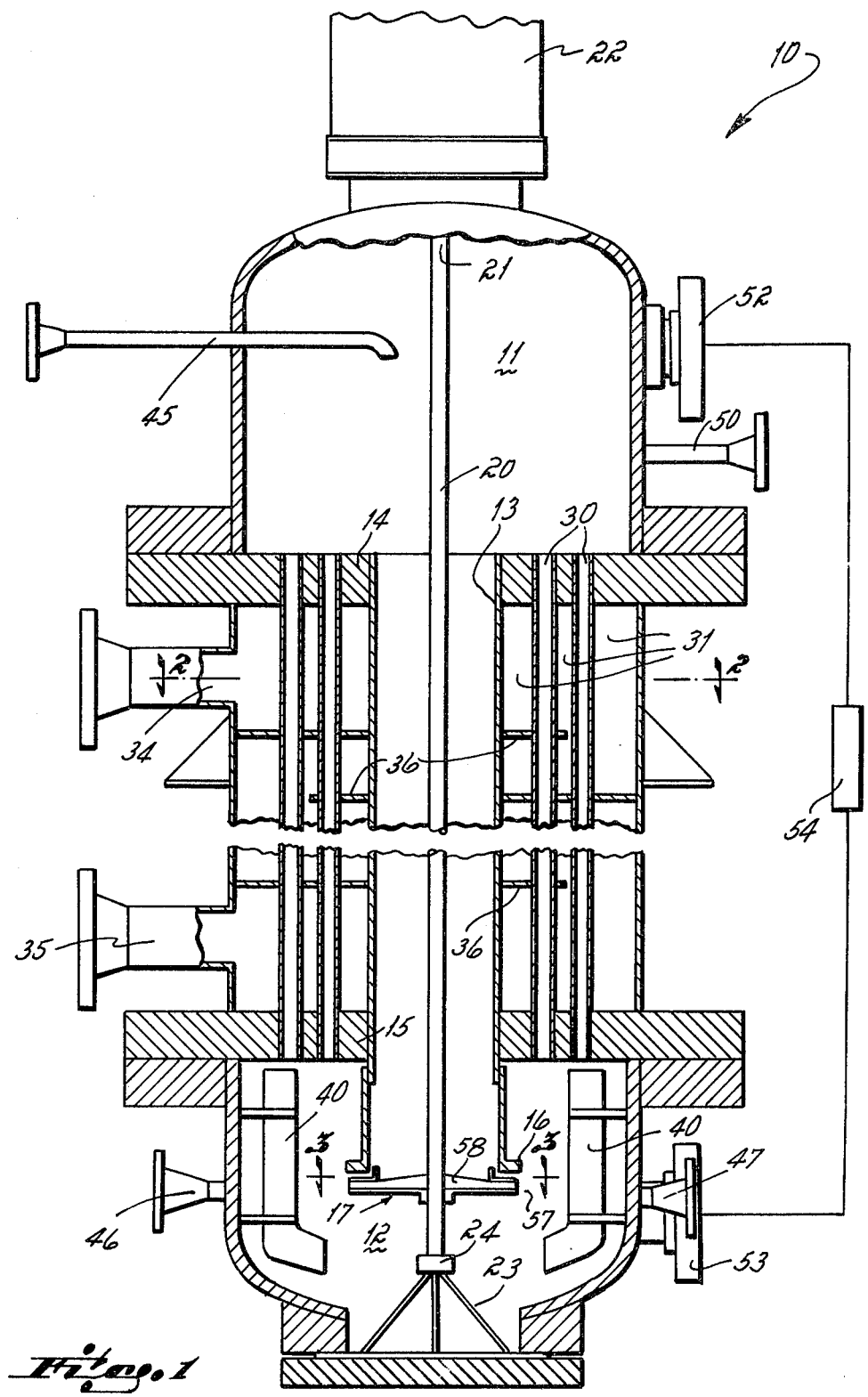
FIG. 1 is a diagrammatic vertical section through the mixing vessel of the present invention.

The mixing apparatus of the present invention is as shown in FIG. 1. An elongated vessel 10 is circular in horizontal section. It has an upper chamber 11 and a lower chamber 12. A draft tube 13 communicating between the upper and lower chambers is located in the central portion of the vessel and is supported between an upper tube sheet 14 and a lower tube sheet 15. The draft tube has at its lower end a flange 16 to which a centrifugal impeller 17 is mounted. The impeller is driven by a vertical shaft 20 passing vertically through the center of the vessel. The shaft is connected at its upper end 21 to an external drive 22 mounted on top of the vessel 10. A tripod 23 at the lower end of the vessel supports a bearing 24 on which the lower end of the shaft 21 is rotatably mounted.

A bundle of heat exchanger tubes 30 surround the draft tube 13 and are supported at their upper and lower ends by the upper and lower tube sheets 14 and 15, respectively. The space surrounding the tubes 30, indicated at 31, is normally filled with a heat exchange medium as, for example a refrigerant where heat is extracted from the reaction or steam or hot fluid where heat is added to the reaction. That space is connected to an outlet port 34 and an inlet port 35 by which the heat exchange medium is passed around the heat exchanger tubes 30. Baffles 36 within the heat exchange chamber 31 force the heat exchange fluid through the tortuous path from the lower portion to the upper portion of the heat exchange section 31.

The lower end of the vessel is provided with vertically oriented, circumferentially spaced baffle plates 40 which break up the swirling flow of liquid in the bottom of the vessel and create a high degree of mixing.

Inlet port 45 is provided at the upper end of the vessel for the introduction of raw material and at least two inlet ports 46 and 47 are located in the lower end of the vessel for the introduction of raw material. The position at which raw material is introduced within the vessel obviously can be varied depending upon the conditions of the process performed within the vessel.

An outlet port 50 is provided for the removal of product. The outlet port is located at the side of the vessel adjacent the upper ends of the heat exchanger tubes 30. Diaphragm-type detectors 52 and 53 are located at the upper and lower ends of the vessel and are connected to a gauge 54 for measuring pressure differential between the upper and lower ends of the vessel so that the head which drives liquid through the heat exchanger tubes can be continuously monitored.

Figure 3:
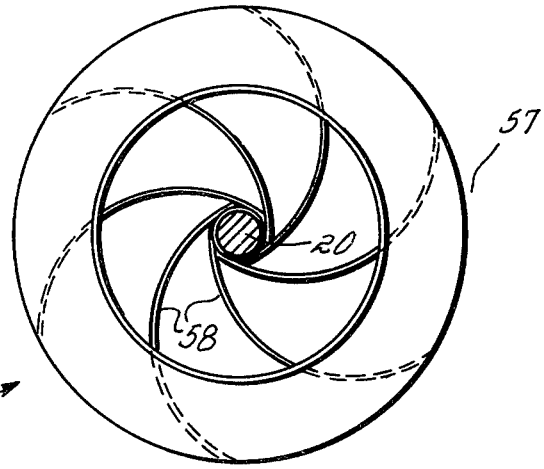
FIG. 3 is a cross-sectional view taken along lines 3—3 of FIG. 1.

As shown in FIGS. 1 and 3, the centrifugal impeller 17 functions as a centrifugal pump and is located with its inlet end facing the draft tube 13 by mounting the upper shroud section of the impeller facing flange 16. The outlet of the impeller is a circumferential opening 57 surrounding the impeller blades 58.

The impeller causes the liquid to be drawn through the draft tube and forced outwardly from the centrifugal impeller 17 into the lower chamber 12 wherein great turbulence causes an intimate mixing of the liquids in the vessel. The centrifugal impeller also generates dynamic head that drives the liquid through the heat exchanger tubes.

While the dimensions and the like of the vessel may be varied considerably depending upon the process that is to be performed, the following are the parameters of the mixing vessel in the illustrated form:

The vessel has approximately 100 gallons capacity. Its overall length is approximately 9 feet. Its inside diameter is approximately 2 feet. The draft tube is approximately 7 feet long with an inside diameter of about 7.5 inches. 222 heat exchanger tubes are exposed around the draft tube on 1¼ inch centers, each tube being approximately 1 inch in inside diameter. The centrifugal pump delivers between 500–1000 gallons per minute.

As indicated above, the invention has many processing applications as, for example, esterification, nitration, sulfonation and the blending of polymers with solvents as, for example, in the process of thinning polyester resins with styrene. In the described form of the invention, the apparatus is intended for use as a reactor for the production of thermoplastic polyester resins in a continuous operation, utilizing the process which is disclosed in U.S. Pat. No. 3,723,390. As described in that patent, the polyester resins have been produced in a Marco reactor which is described generally in that patent. The Marco raactor has severe maintenance problems which require it to be torn down, cleaned and rebuilt periodically at considerable cost.

It is an objective of the present invention to produce a polyester resin comparable to that produced in the Marco reactor but with an overall improvement in efficiency and certainly with an improvement in the cost of maintaining the reactor.

In the operation of the invention, the reactants are introduced, in the proportions set forth in the patent, into the inlets 45, 46, 47 and such other inlets as are required. The reactants are initially back mixed in the chamber 11, in the draft tube 13 and in the chamber 12 wherein they are subjected to high turbulence created by the centrifugal impeller 17 delivering up to 1000 gallons per minute. The thus mixed reactants pass upwardly through the heat exchanger tubes 30 wherein reaction continues as in a plug flow process.

Product is continuously withdrawn from the outlet 50 at a rate equal to the introduction of the raw material reactants.

Figure 6:
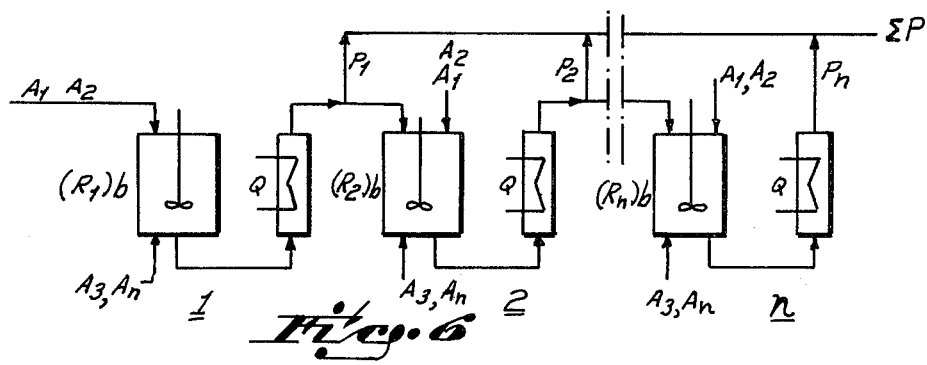
FIG. 6 is a theoretical flow diagram of a reaction taking place in the vessel of the present invention.

This process is diagrammatically illustrated in FIG. 6. There A1, A2, . . . An are reactants fed into the reactor at a constant rate. P1, P2, . . . Pn are products removed from the reactor at stages 1, 2, . . . n, respectively. Q is the heat added to or removed from the reactor. $(R_1)b$, $(R_2)b$ . . . $(R_n)b$ represents the back mix reaction process. $(R_1)p$, $(R_2)p$ . . . $(R_n)p$ represents the plug flow reaction process. This diagram illustrates the successive stages of back mix and plug flow processes which are performed within the single vessel.

Figure 2:
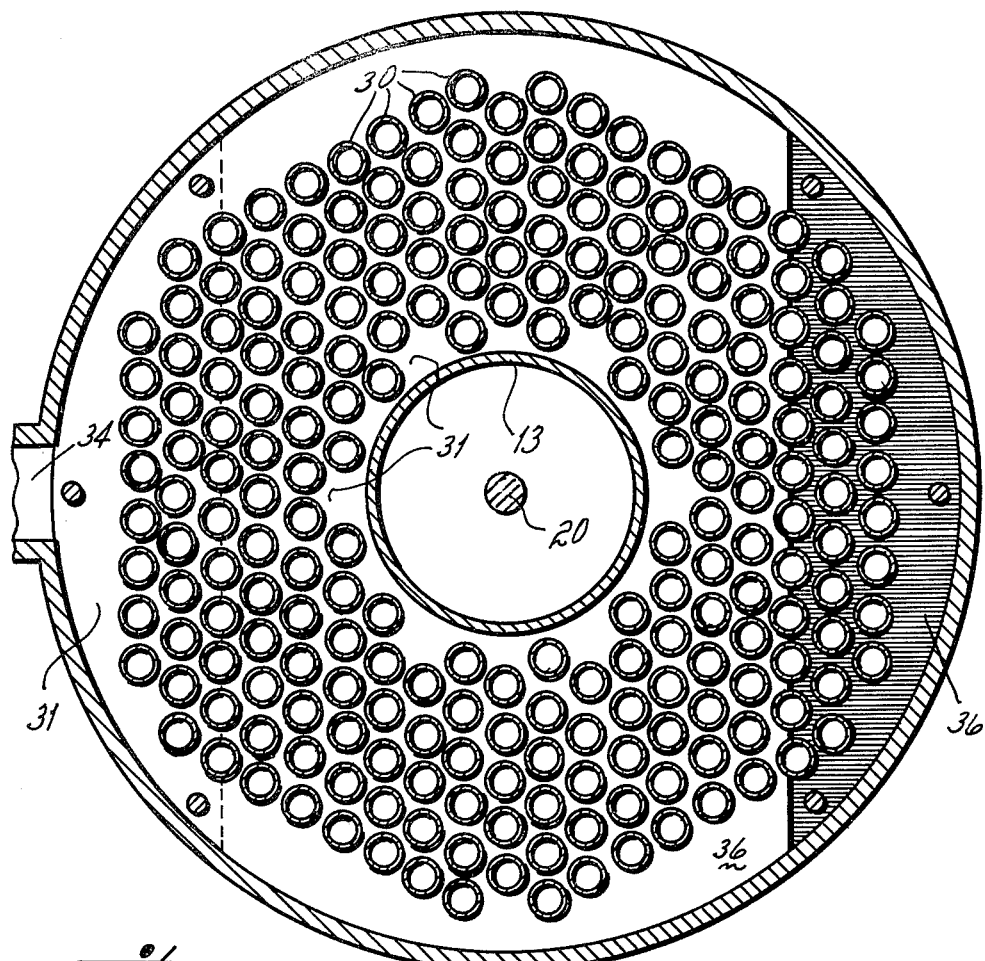
FIG. 2 is a cross-sectional view taken along lines 2—2 of FIG. 1.
Figure 4:
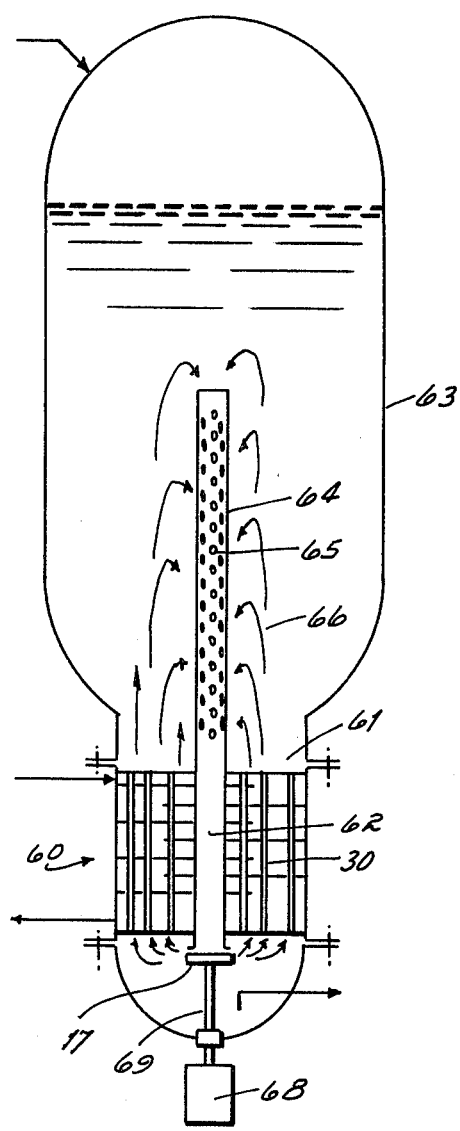
FIG. 4 is an alternative embodiment of the invention.

FIG. 4 illustrates an alternative use of the vessel of the present invention. There, a small reactor of the type and approximate size described in connection with FIGS. 1 through 3 is indicated at 60. The reactor is open at its upper end 61 and is removably connected to and in communication with another vessel 63. The draft tube 62 of the reactor 60 has an elongated extension 64 having holes 65 spaced vertically and circumferentially along its length. The vessel 63 might contain, for example, 1000 to 10,000 gallons and is used in association with the reactor 60.

The centrifugal impeller 17 is driven by a motor 68 located at the bottom of the reactor 60 and connected to the centrifugal impeller by a shaft 69.

This reactor could be used as a batch mixing apparatus in processes such as thinning a polyester resin with a styrene solvent. In this process, the reactor 60 operates generally as described in connection with FIGS. 1 to 3 except that the liquids discharged from the heat exchanger tubes 30 are forced upwardly in the direction of the arrows 66 to enter the extended draft tube 64.

An advantage of the apparatus of FIG. 4 resides in the ease of maintaining the apparatus. It is not an infrequent occurrence that the material within the reactor inadvertently gels before it is discharged from the reactor. In that event, the reactor can be cleaned relatively simply by cleaning the reactor 60 and the vessel 63 as separate units. The vessel 63, which has no heat exchanger components in it, can be cleaned by a relatively simple jack hammering process to remove the gelled polymer. The reactor 60, once removed from the vessel 63, can be cleaned principally by simply boring out the heat exchanger tubes 30 and the draft tube 13. The chambers above and below the heat exchanger can be cleaned by jack hammering.

Figure 5:
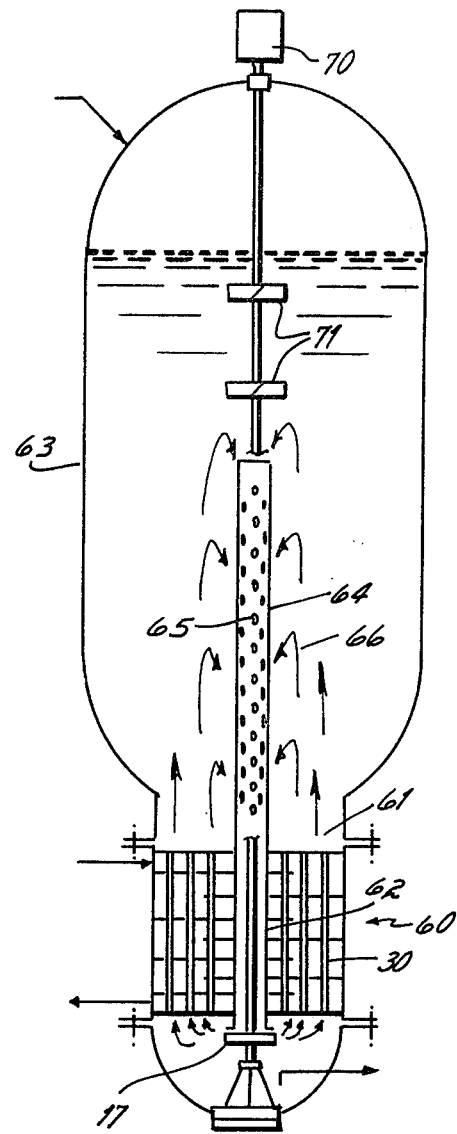
FIG. 5 is still another alternative embodiment of the invention.

An alternative to the apparatus of FIG. 4 is illustrated in FIG. 5. There, the drive train 70 is located at the top of the larger vessel 63 and is connected to the centrifugal impeller 17 as previously described. The other principal difference between this apparatus and the apparatus of FIG. 4 resides in the addition of agitator blades 71 which insure a more complete mixing of the liquids in the vessel 63.

The invention also contemplates the possibility of reversing the flow from the centrifugal impeller 17 as, for example, by placing the impeller at the top of the draft tube 13 in FIG. 1 so as to drive liquids up the draft tube and draw them downwardly through the heat exchanger tubes. This form of the invention has application where it is desired to remove water vapor or the like from the liquid. When reversed, water sprayed upwardly against the top dish of the vessel will evaporate rapidly and can be easily removed.

Having described my invention, I claim:

1. Chemical mixing apparatus for mixing liquids having a tendency to gel during mixing comprising, a vessel, said vessel including an upper section, a middle section and a lower section, said upper section being connected to said middle section and the interior of said upper section being open to the interior of said middle section and said middle section being attached to said lower section and the interior of said middle section being open to the interior of said lower section;

means to detach said upper section from said middle section;

means to detach said middle section from said lower section;

said upper section, said middle section and said lower section joining together to define a pressurizable mixing area;

a large, vertical draft tube open at both ends in the central portion of the middle section of the vessel, a plurality of vertical heat exchanger tubes, open at both ends, surrounding said draft tube, said tubes positioned within the middle section of said vessel, a centrifugal impeller at one end of said draft tube to circulate fluids between said draft tube and said heat exchanger tubes, a means for circulating heat exchange fluid around said heat exchanger tubes, and means to measure the pressure differential between said upper and said lower sections.

2. Apparatus as in claim 1 in which said centrifugal impeller is connected at the lower end of said draft tube to draw fluid down said draft tube and to drive it up said heat exchanger tubes into said upper section.

3. Apparatus as in claim 2 in which said centrifugal impeller includes a drive shaft mounted in the upper end of said vessel and extending downwardly through said draft tube to a centrifugal impeller at the lower end of said tube.

4. Apparatus as in claim 1 further comprising at least one inlet in the upper section of said vessel for introducing said liquids having a tendency to gel into said vessel, and at least one outlet in said vessel for withdrawing product from said vessel.

5. Apparatus as in claim 1 wherein said upper section is substantially larger than said middle and lower sections, said draft tube extending upwardly well into said upper section.

6. Apparatus as in claim 5, the upper portion of said draft tube extending into said upper section and having openings therein spaced vertically along its length.

7. Apparatus as in claim 5, further comprising agitators in said upper section.

* * * * *